(12) United States Patent
Yamada et al.

(10) Patent No.: US 6,353,786 B1
(45) Date of Patent: Mar. 5, 2002

(54) BRAKING DEVICE FOR AN ELECTRICALLY-POWERED CAR THAT USES A LOAD OF AN ELECTRICAL MOTOR AS A BRAKING FORCE

(75) Inventors: Yoshiaki Yamada; Jun Yamada, both of Ageo (JP)

(73) Assignee: Nissan Diesel Co., Ltd., Saitama (JP)

( * ) Notice: Subject to any disclaimer, the term of this patent is extended or adjusted under 35 U.S.C. 154(b) by 0 days.

(21) Appl. No.: 09/720,716
(22) PCT Filed: Mar. 24, 1999
(86) PCT No.: PCT/JP99/01496
§ 371 Date: Dec. 28, 2000
§ 102(e) Date: Dec. 28, 2000
(87) PCT Pub. No.: WO00/00363
PCT Pub. Date: Jan. 6, 2000

(30) Foreign Application Priority Data

Jun. 30, 1998 (JP) .......................................... 10-184089

(51) Int. Cl.[7] .............................. B60T 8/64; G06F 7/00
(52) U.S. Cl. ......................................... 701/70; 303/152
(58) Field of Search ............................. 701/70, 71, 78, 701/83; 303/152, 113.2, 3

(56) References Cited

U.S. PATENT DOCUMENTS

| 5,882,093 A | * | 3/1999 | Enomoto et al. ............ 303/152 |
| 5,951,115 A | * | 9/1999 | Sakai et al. .................... 303/3 |
| 6,024,420 A | * | 2/2000 | Yonemura et al. ....... 303/113.2 |
| 6,070,954 A | * | 6/2000 | Urababa et al. ............. 303/152 |

FOREIGN PATENT DOCUMENTS

| JP | 05-284607 | 10/1993 |
| JP | 08-163008 | 6/1995 |
| JP | 08/308016 | 11/1996 |
| JP | 09-74605 | 3/1997 |
| JP | 09-154202 | 6/1997 |
| JP | 09-289705 | 11/1997 |

* cited by examiner

Primary Examiner—Jacques H. Louis-Jacques
(74) Attorney, Agent, or Firm—Rabin & Berdo

(57) ABSTRACT

A vehicle is provided with an electrical motor for driving the vehicle using a battery as a power source. A braking device of the vehicle maximizes the generation of a regenerative braking force of an electrical motor in a range of electricity supplied to the battery, while satisfying the required braking force in response to an applied braking amount.

3 Claims, 5 Drawing Sheets

BRAKING DEVICE FOR AN ELECTRICALLY-POWERED CAR THAT USES A LOAD OF AN ELECTRICAL MOTOR AS A BRAKING FORCE

FIELD OF THE INVENTION

This invention relates to a braking device for a vehicle. In particular, this invention relates to a technique of optimizing control of a brake device in a vehicle using a load as a braking force, the load occurs when an electrical motor driving the vehicle generates electricity during braking.

BACKGROUND OF THE INVENTION

A vehicle is provided with an electrical motor for driving the vehicle which uses a battery as a power source, and is provided with a controller comprising a microcomputer for controlling the electrical motor, which controls the electrical motor so that a required drive torque is generated in response to an operational condition signal such as the stroke amount of an accelerator pedal, is known in the prior art.

In this type of vehicle, when the accelerator pedal is released, the load on the electrical motor which had been driving the drive system including the drive wheels is reversed. The electrical motor is driven by the drive system. At this time, regeneration braking control is performed to make effective use of the inertial energy of the vehicle. That is to say, generation of electricity is performed in the electrical motor by the driving force from the drive system. The generating load on the electrical motor at this time is used as a braking force and the generated electricity from the electrical motor is supplied to charge the battery. However when this type of vehicle is slowing down, the possibility exists of overcharging the battery as the braking force of the braking device and the amount of generated electricity from the electrical motor are not limited to an appropriate range for a required braking force determined in response to a brake pedal operational amount. On the other hand, Tokkai-Hei-8-308016 published by the Japanese Patent Office in 1996 discloses a control which is performed not with the regeneration amount of the electrical motor but in a generator driven by the engine in order to prevent over-supply of electricity during regenerative braking of the electrical motor in the electrical generator of a hybrid drive system.

SUMMARY OF THE INVENTION

The present invention is proposed to solve the above problem and has the object of maximizing the regenerative braking force of the electrical motor in a range of the electricity supply amount to the battery while satisfying the required braking force in response to the brake pedal operational amount. This is enabled by controlling the regenerative braking force of the electrical motor and the braking force of the braking device during braking of the vehicle. The braking force calculation means calculates a driven-wheel braking force $B_{FO}$ in response to a braking operational amount of the driver, a driving-wheel braking force $B_{RO}$ and a driven-wheel minimum required braking force $B_{FM}$. The required braking force calculation means calculates the required braking force $BO=B_{FO}+B_{RO}-B_{FM}$ based on each braking force. The first regenerative braking force calculation means calculates the regenerative braking force $B_M$ which can be generated by the electrical motor. The second regenerative braking force calculation means calculates the regenerative braking force $B_B$ of the power supply equivalent input to the battery. The regenerative braking force setting means compares the values $B_M$ and $B_B$ and sets $B_M$ as a regenerative braking force $B_M$ of the electrical motor when is $B_B$ greater than or equal to $B_M$ and sets $B_B$ as the regenerative braking force $B_M$ when is $B_B$ smaller than $B_M$. Furthermore a regenerative braking control means is provided which compares the set regenerative braking force $B_M$ and the required braking force $B_O$ and controls the electrical motor and the braking mechanism. When $B_M$ is greater than or equal to $B_O$, a required braking force $B_O$ is generated only by the electrical motor, while generating the driven-wheel minimum required braking force $B_{FM}$. When $B_M$ is smaller than $B_O$, a regenerative braking force $B_M$ is generated by the electrical motor while generating the driven-wheel minimum required braking force $B_{FM}$ and the remainder of the braking force is generated by the vehicle braking mechanism in the range of the driving-wheel braking force $B_{RO}$ and the driven-wheel braking force $B_{FO}$.

When a braking operation is performed while the vehicle is slowing down, this invention allows the calculation of the driving-wheel braking force $BR_O$, the driven-wheel braking force $BF_O$ and the driven-wheel minimum required braking force $B_{FM}$ in response to the braking operational amount. Thus it is possible to calculate a required braking force $B_O=BF_O+BR_O-B_{FM}$. A regenerative braking force $B_M$ generated by the electrical motor and the regenerative braking force $B_B$ of the power supply equivalent input to the battery are calculated. The comparison of the values $B_B$ and $B_M$ allows a regenerative braking force $B_M$ of the electrical motor to be re-set as $B_M$ when $B_B$ is greater than or equal to $B_M$ or as $B_B$ when $B_B$ is smaller than $B_M$. When $B_M$ is greater than or equal to $B_O$, only the electrical motor generates the required braking force $B_O$ by control based on a comparison of the regenerated braking force $B_M$ and the required braking force $B_O$. The driven-wheel minimum required braking force $B_{FM}$ is generated by the braking mechanism. When $B_M$ is smaller than $B_O$, the driven-wheel minimum required braking force $BF_M$ is generated by the braking mechanism and the regenerative braking force $B_M$ is generated with the electrical motor.

The remainder is generated by the braking mechanism in the range of the driving-wheel braking force $BR_O$ and the driven-wheel braking force $BF_O$. Thus it is possible to prevent over-supply of electricity to the battery while satisfying the braking force required by the brake operational amount. In this way, it is possible to optimize the generation of a regenerative braking force by the electrical motor in a permitted battery range. Furthermore since a braking force above the minimum required braking force acts on the driven wheel, it is possible to generate a required braking force only with the electrical motor and thus it is possible to maintain sufficient operational stability in the vehicle.

It is possible to apply various types of controllable braking mechanisms in a control device comprising a microcomputer or the like to the braking force as a vehicle braking mechanism. These types of braking mechanisms comprise a brake plunger, a pressure proportion control valve, and a pressure regulation means. The brake plunger operates a braking force on vehicle wheels based on the pressure from a pressure source for example. The pressure proportion control valve adds pressure in response to commands from a control means and/or a brake pedal operational amount of the driver. The pressure regulation means comprises a solenoid pilot operation section, a cut-off valve or the like which regulates the pressure supplied to the pressure proportion control valve in response to the brake pedal operational amount (the amount of brake pedal activation) based on commands from the regenerative braking control means. In this case, during regenerative braking, the regenerative braking control means suppresses the pressure in response to the brake pedal operational amount due to the pressure regulation means and the remainder of the regenerative braking force with respect to the required braking force is generated by the brake plunger by controlling the pressure proportion control valve.

BEST MODE FOR PERFORMING THE INVENTION

Figure 1:
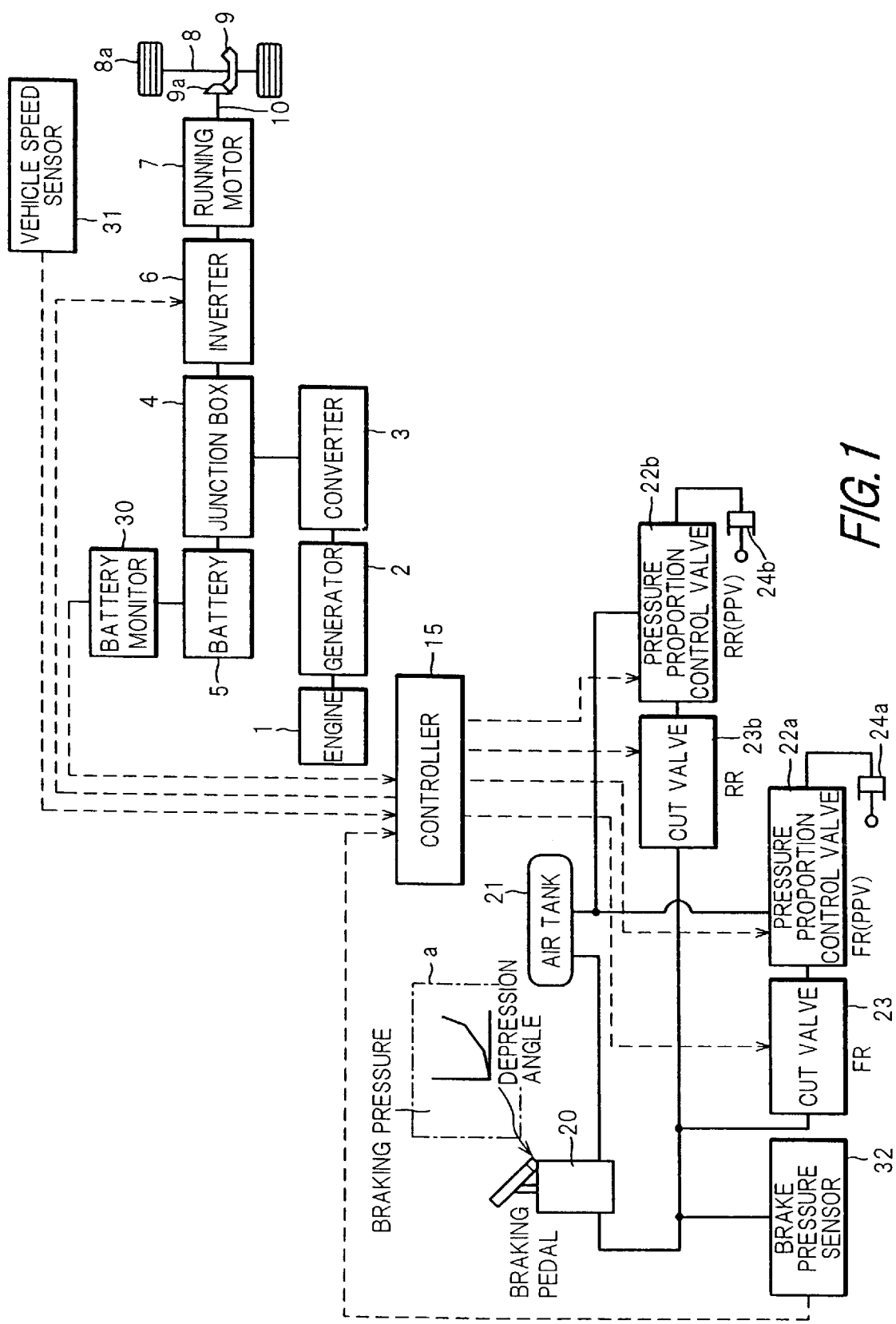
FIG. 1 is a schematic figure of an embodiment of this invention.

In FIG. 1, reference numeral 1 denotes an engine for generating electricity. A rotation shaft of the electrical motor (generator) 2 is connected through a speed increasing mechanism (not shown) to the output shaft of the engine 1. The electrical force generated by the electrical generator 2 is supplied to drive an electrical motor 7 or to charge the battery 5 through a junction box 4 from a converter 3. Reference numeral 8 denotes a shaft of a drive shaft 8a. A differential gear 9 is interposed on a central portion of the shaft 8. One end of a propeller shaft 10 is connected to a drive pinion 9a of the differential gear 9 and the other end of the propeller shaft 10 is connected to the rotation shaft of the electrical motor 7 through a braking mechanism.

The electrical motor 7 is driven by the application of an electrical force from an inverter 6. This output is transmitted to a drive wheel 8a through the drive system downstream of the propeller shaft 10 mentioned above. When the vehicle is braking, the load on the drive system reverses, that is to say, the electrical motor 7 is driven by the drive system. This load applies a braking force on the vehicle. Thus at this time, regenerative braking is performed which involves supplying electrical force generated by the electrical motor 7 to the battery 5 through the inverter 6.

A controller 15 and an inverter 6 control the operation of the electrical motor 7. The inverter 6 controls the electrical motor 7 in response to a torque command from the controller 15. When the torque command is positive, the battery 5 or the electrical generator 2 supplies electrical force to the electrical motor 7 in response to the torque command. On the other hand, when the torque command is negative, the electrical motor 7 supplies electrical force to the battery 5 in response to the torque command. Furthermore when the torque command is zero, the supply of electrical force is suspended. The controller 15 comprises an electronic control device formed by a microcomputer or the like and control of the vehicle braking mechanism is performed during regenerative braking as stated below.

Reference numeral 20 denotes a brake valve of a braking mechanism provided as a vehicle air brake system. The brake valve 20 supplies a signal pressure in response to a pedal depression amount of the driver to the pressure proportion control valves 22a, 22b through respective cut-off valves 23a, 23b from an air tank 21. The cut-off valves 23a, 23b are normally during non-regenerative braking maintained in an open position and the signal pressure from the brake valve 20 is transmitted to the pressure proportion control valve 22a, 22b. However during regenerative braking by the electrical motor 7 as discussed above, the valve is switched to a closed position and the signal pressure to the pressure proportion control valve 22a, 22b is changed to the exhaust side.

Each pressure proportion control valve 22a, 22b supplies a braking pressure in response to a signal pressure from the brake valve 20 with a predetermined braking force distribution from the air tank 21 to each brake chamber 24a, 24b. A solenoid pilot operational portion (not shown) is provided in the pressure proportion control valve 22a, 22b. During regenerative braking in which the cut-off valve 23a, 23b is switched to an exhaust side, the solenoid pilot operational portion operates a pressure proportion control valve 22a, 22b in response to an exciting current controlled by the controller 15. The solenoid pilot operational portion regulates the air pressure from the air tank 21 to a braking pressure in response to the exciting current and supplies this pressure to each braking chamber 24a, 24b. The brake chamber 24a is applied to the front driven wheels and the brake chamber 24b is applied to the rear driven wheels. In the figure, although only one of each is shown, respective units are actually provided for the number of vehicle wheels.

A detection means is required for the control of the regenerative braking force of the electrical motor 7 and the braking force of each brake force $B_F$, $B_R$ of the brake chambers 24a, 24b as discussed above. Such detection means is connected in the controller 15 and comprises a battery monitor 30 which detects a charging ratio $B_W$ in the battery 5, a vehicle speed sensor 31 detecting a vehicle speed V, and a brake pressure sensor 32 which detects a signal pressure P of the brake valve 20.

Figure 2:
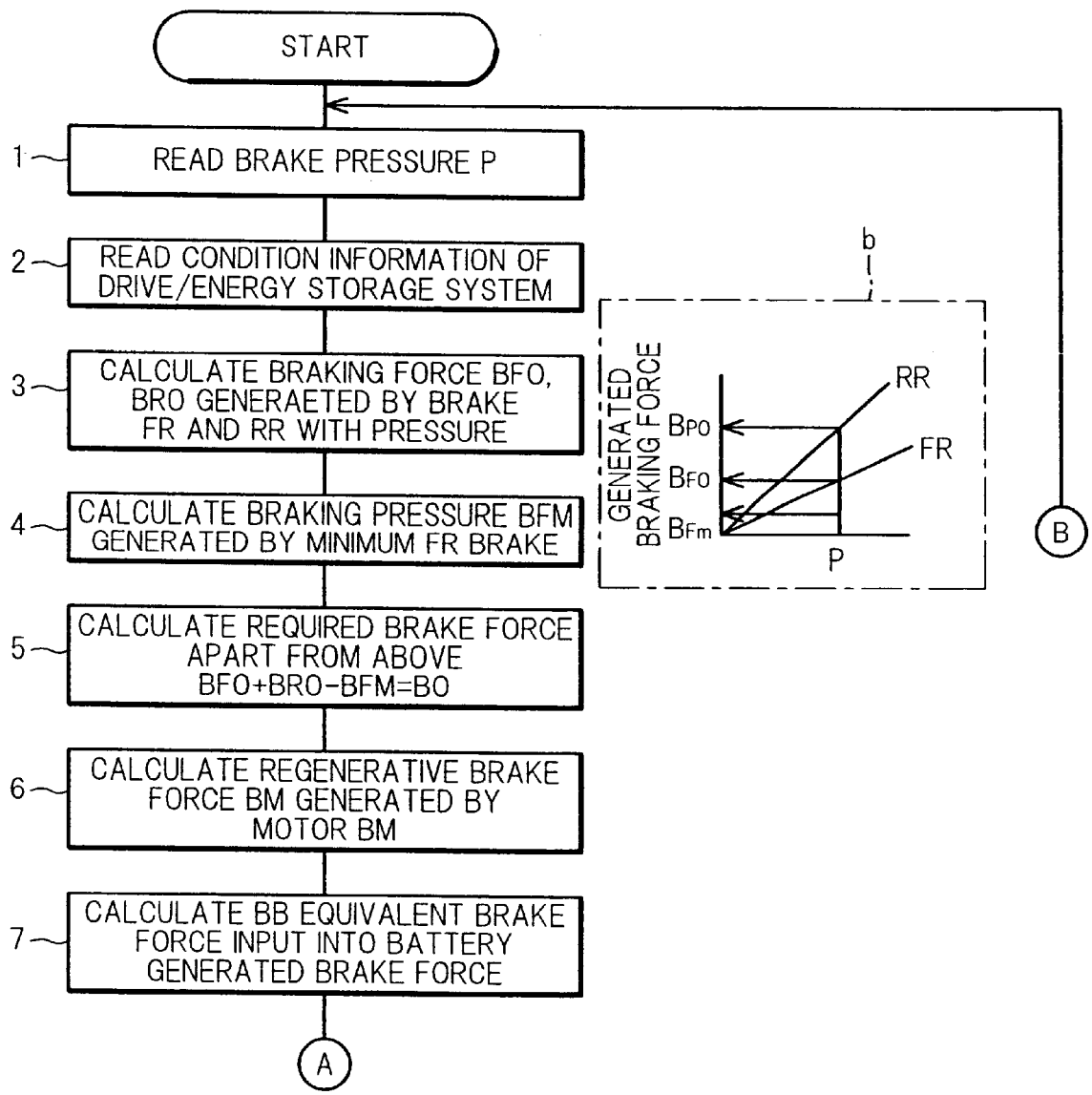
FIG. 2 is a flow diagram showing the contents of control of the controller in this embodiment.
Figure 3:
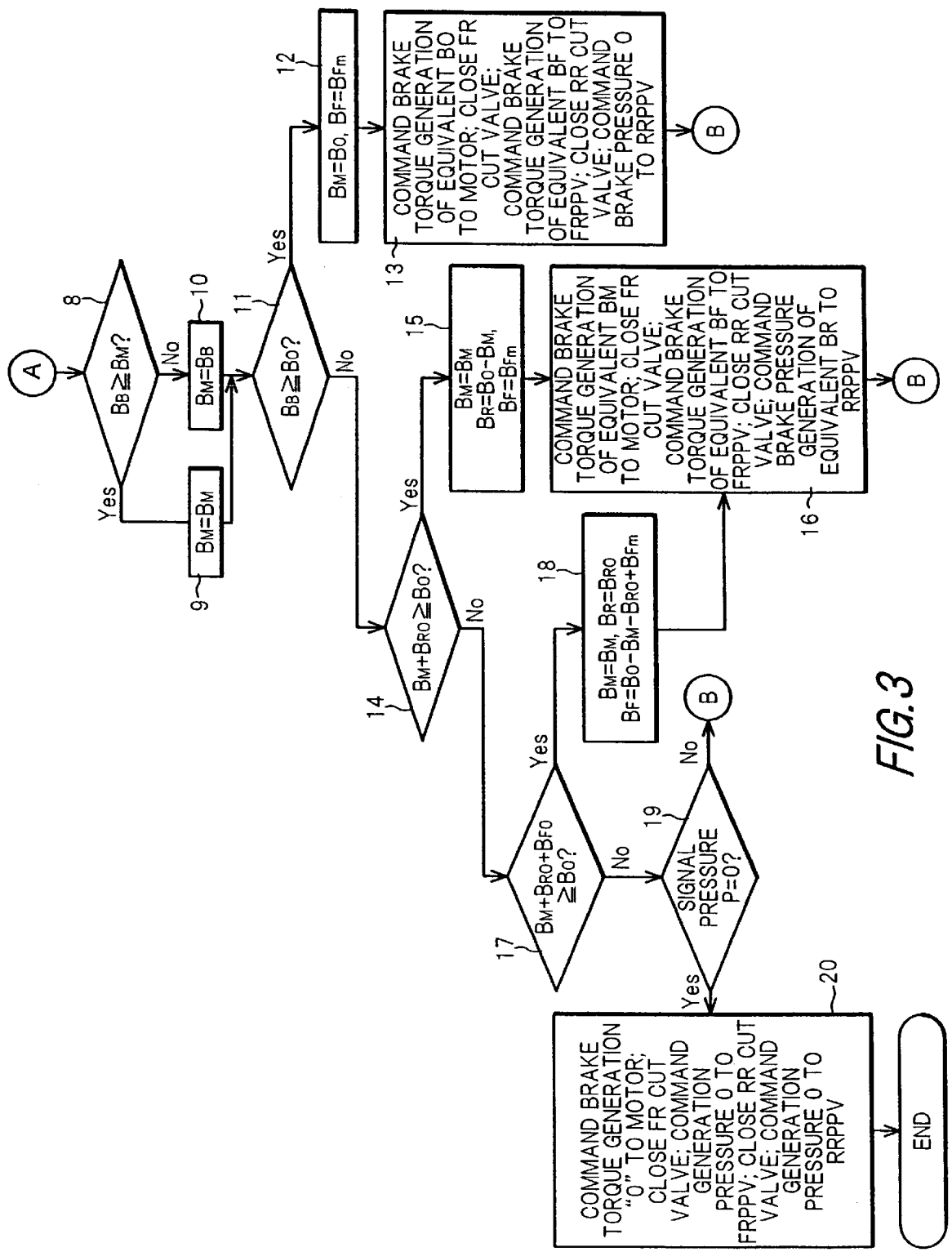
FIG. 3 is a flow diagram showing the contents of control of the controller in this embodiment.

As shown in FIG. 2 and FIG. 3, the controller 15 comprises braking force calculation means (step 1, step 3, step 4), required braking force calculation means (step 5), first regenerative braking force calculation means (step 2, step 6) and second regenerative braking force calculation means (step 2, step 7). Each braking force calculation means calculates a front-wheel braking force $B_{FO}$, a rear-wheel braking force $BR_O$ and a front-wheel minimum required braking force $BF_M$. Each forces $BF_O$, $BR_O$ and $B_{FM}$ respond respectively to a pressure signal P from the brake valve 20. The required braking force calculation means calculates the required braking force $B_O = B_{FO} + B_{RO} - B_{FM}$ based on each braking force. The first regenerative braking calculation means calculates the regenerative braking force $B_M$ which can be generated by the electrical motor 7. The second regenerative braking force calculation means calculates the regenerative braking force $B_B$ of the power supply equivalent input to the battery 5.

The regenerative braking force setting means (step 8 to step 10) compares the values $B_M$ and $B_B$ and re-sets $B_M$ as a regenerative braking force $B_M$ of the electrical motor when is $B_B$ greater than or equal to $B_M$ and re-sets $B_B$ as the regenerative braking force $B_M$ when is $B_B$ smaller than $B_M$. Furthermore a regenerative braking control means (step 11 to step 20) is provided which compares the set regenerative braking force $B_M$ and the required braking force $B_O$ and controls the inverter 6 of the electrical motor 7 and the pressure proportional control valve 22a, 22b. The regenerative braking control means controls as following; when $B_M$ is greater than or equal to $B_O$, a required braking force $B_O$ is generated only by the electrical motor 7, while generating the front-wheel minimum required braking force $B_{FM}$, when $B_M$ is smaller than $B_O$, a regenerative braking force $B_M$ is generated by the electrical motor 7 while generating the front-wheel minimum required braking force $B_{FM}$, and the remainder is supplemented by the braking force due to the vehicle braking mechanism in the range of the rear-wheel braking force $B_{RO}$ and the front-wheel braking force $B_{FO}$.

FIG. 2 and FIG. 3 will be described in further detail below. In a step 1, a signal pressure P from the brake valve 20 is read. In a step 2, the charging ratio $B_W$ of the battery 5 and the vehicle speed V are read. In a step 3, the rear-wheel braking force $B_{RO}$ and the front-wheel braking force $B_{FO}$ in response to a signal pressure P from the brake valve 20 are calculated from a pre-set control map as a characteristic figure b in FIG. 2. In a step 4, a front-wheel minimum required brake force is calculated from the map in the same manner in response to a signal pressure P from the brake valve 20 in order to maintain vehicle handling performance and stability.

Figure 4:
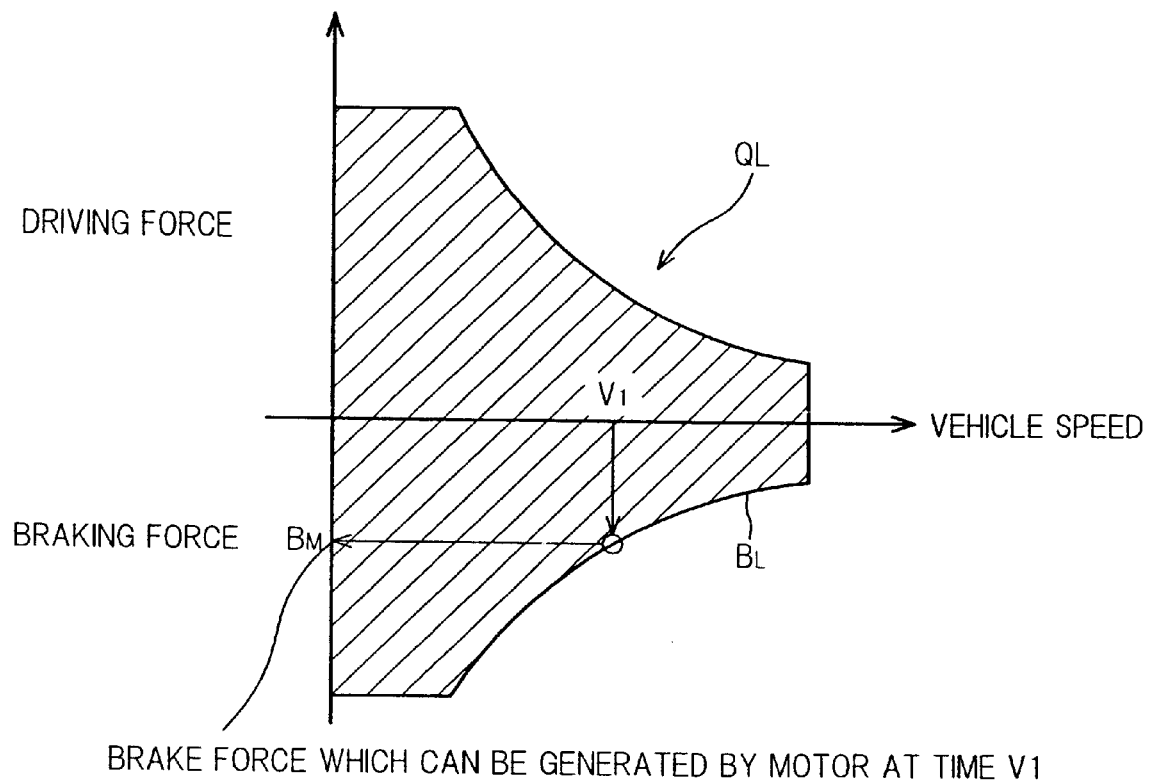
FIG. 4 is a figure showing the characteristics of braking force generated by the electrical motor in this embodiment.

In a step 5, the braking forces $B_{RO}$, $B_{FO}$, $B_{FM}$ are used in the calculation of the required braking force $B_O$ ($B_O = B_{FO} + B_{RO} - B_{FM}$). In a step 6, the regenerative braking force $B_M$ generated by the electrical motor 7 in response to the vehicle speed V is calculated. For example, the characteristics of the electrical motor 7 as shown in FIG. 4 are set in the memory as a control map. The map of characteristics is searched and $B_M$ is given as a regenerative braking force generated by the electrical motor 7 when vehicle speed V is $V_1$. In FIG. 4, QL is a drive torque line. This is reversed to a negative value to become the braking torque line BL.

In a step 7, the regenerative braking force $B_B$ of the power supply equivalent input to the battery 5 is calculated from the charging ratio $B_W$ of the battery 5. In step 8 of FIG. 3, the comparison of the values $B_B$ and $B_M$ is performed. The regenerative braking force $B_M$ which can be generated by the electrical motor 7 is set without change as $B_M$ in a step 9 when $B_B$ is greater than or equal to $B_M$. On the other hand, when $B_B$ is smaller than $B_M$, $B_B$ is re-set as the regenerative braking force $B_M$ which can be generated with the electrical motor in a step 10.

The set regenerative braking force $B_M$ is compared with the required braking force $B_O$ ($B_O = B_{FO} + B_{RO} - B_{FM}$) in a step 11. When $B_M$ is greater than or equal to $B_O$, the following settings are made in a step 12: $B_M = B_O$, $B_F = B_{FM}$. In a step 13, a negative torque command is output which generates a regenerative braking force equivalent $B_M = B_O$ in the electric motor 7 is output. The front-wheel cut-off valve 23a and the rear-wheel cut-off valve 23b are closed and a braking pressure command equivalent $B_F = B_{FM}$ is output to the front-wheel pressure proportion control valve 22a. A brake pressure zero command is output to the rear-wheel pressure proportion control valve 22b.

When $B_M$ is smaller than $B_O$, it is determined whether or not $B_M + B_{RO}$ is greater than or equal to $B_O$ in a step 14. When $B_M + B_{RO}$ is greater than or equal to $B_O$, the following settings are performed in a step 15: $B_M = B_M$, $B_R = B_O - B_M$, $B_F = B_{FM}$. Then in a step 16, a negative torque command is output which generates the regenerative braking force equivalent $B_M = B_M$ in the electric motor 7. The front-wheel cut-off valve 23a and the rear-wheel cut-off valve 23b are closed and the braking pressure command equivalent $B_F = B_{FM}$ is output to the front-wheel pressure proportion control valve 22a. The brake pressure command equivalent $B_R = B_O - B_M$ is output to the rear-wheel pressure proportion control valve 22b.

When the result of the determination in the step 14 is that $B_M + B_{RO}$ is smaller than $B_O$, in a step 17, it is determined whether or not $B_M + B_{RO} + B_{FO}$ is greater than or equal to $B_O$. When $B_M + B_{RO} + B_{FO}$ is greater than or equal to $B_O$, the following settings are performed in a step 18: $B_M = B_M$, $B_R = B_{RO}$, $B_F = B_O - B_M - B_{RO} + B_{FM}$. Then in a step 16, the negative torque command is output which generates the regenerative braking force equivalent $B_M = B_M$ in the electric motor 7. The front-wheel cut-off valve 23a and the rear-wheel cut-off valve 23b are closed and the braking pressure command equivalent $B_F = B_O - B_M - B_{RO} + B_{FM}$ is output to the front-wheel pressure proportion control valve 22a. The braking pressure command equivalent $B_R = B_{RO}$ is output to the rear-wheel pressure proportion control valve 22b.

The processing in the steps 1 to 18 is repeated until the signal pressure P of the brake valve 20 in the step 19 takes a value of zero. When the signal pressure P of the brake valve 20 takes a value of zero, in the step 20, a zero or a positive torque command is output which does not result in the generation of the regenerative braking force in the electrical motor 7. The front-wheel cut-off valve 23a and the rear-wheel cut-off valve 23b are opened and respective braking pressure zero commands are output to the front-wheel pressure proportion control valve 22a and the rear-wheel pressure proportion control valve 22b.

Figure 5:
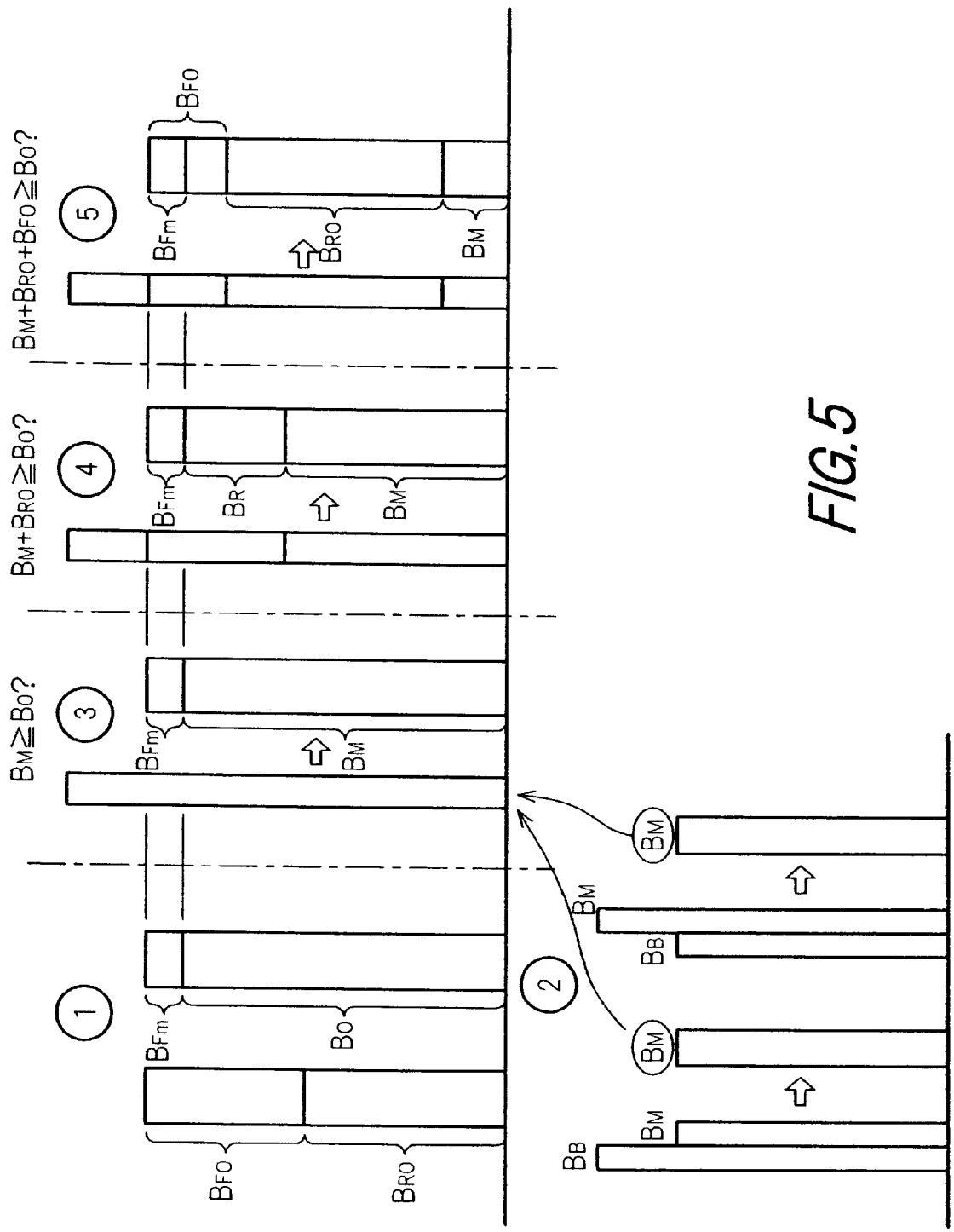
FIG. 5 describes an example of control of the brake force by the controller in this embodiment by use of a bar graph.

FIG. 5 describes an actual example of the control contents of the controller 15. When the vehicle is braking, as ① in FIG. 5, the front-wheel braking force $B_{FO}$, the rear-wheel braking force $B_{RO}$ and the front-wheel minimum required braking force $B_{FM}$ are calculated in response to the signal pressure P of the braking valve 20. The required braking force $B_O = BF_O + BR_O - BF_M$ is calculated based on each braking forces.

In ②, the regenerative braking force $B_M$ which can be generated by the electrical motor 7 is calculated. The regenerative braking force $B_B$ of the power supply equivalent input to the battery 5 is calculated. The regenerative braking force $B_M$ and regenerative braking force $B_B$ are compared, and when is $B_B$ greater than or equal to $B_M$, the regenerative braking force $B_M$ which can be generated by the electrical motor is set as the regenerative braking force $B_M$ of the electrical motor 7. When is $B_B$ smaller than $B_M$, the regenerative braking force $B_B$ of the power supply equivalent input into the battery 5 is set as a regenerative braking force $B_M$ which can be generated by the electrical motor 7. That is to say, the regenerative braking force $B_M$ of the electrical motor 7 is set to the allowable maximum based on the relationship with the regenerative braking force $B_B$ of the power supply equivalent input into the battery 5.

The electrical motor 7 and each brake chamber 24a, 24b are controlled as discussed above based on the front-wheel braking force $B_{FO}$ in response to the signal pressure P of the brake valve 20, the rear-wheel braking force $B_{RO}$ in response to the signal pressure P of the brake valve 20, the front-wheel minimum required braking force $B_{FM}$ in response to the signal pressure P of the brake valve 20 and the required braking force $B_O = B_{FO} + B_{RO} - B_{FM}$.

When $B_M$ is greater than or equal to $B_O$, the minimum required braking force $B_{FM}$ is generated in the front-wheel brake chamber 24a as in ③. Only the electrical motor 7 generates the required braking force $B_O$. When $B_M + B_{RO}$ is greater than or equal to $B_O$, the minimum required braking force $B_{FM}$ is generated in the front-wheel brake chamber 24a as in ④. The regenerative braking force $B_M$ is generated by the electrical motor 7 and the remainder of the braking force ($B_O = B_M$) is generated by the front-wheel braking chamber 24b. When $B_M + B_{RO} + B_{FO}$ is greater than or equal to $B_O$, the regenerative braking force $B_M$ is generated by the electrical motor 7 as in ⑤ and the braking force $B_{FO}$ is generated by the front-wheel braking chamber 24b. The remainder of the braking force ($B_O-B_M-B_{RO}$) and the minimum required braking force $B_{FM}$ is generated by the front-wheel braking chamber 24a.

Such control prevents the over-supply of electricity to the battery 5 while satisfying the required control force B ($B=B_{FO}+B_{RO}$) in response to the brake operational amount. It is possible to maximize the generation of the regenerative braking force $B_M$ in the electrical motor 7 within the permitted battery range. Furthermore since a braking force above the minimum required braking force $B_{FM}$ acts on the front wheel, it is possible to generate a required braking force $B_O$ only with the electrical motor 7 and thus it is possible to maintain sufficient handling performance and stability in the vehicle.

It is possible to vary the structure of the pressure proportion control valves 22a, 22b of the vehicle braking mechanism to a mechanism only provided with a solenoid pilot operational portion. A pedal aperture sensor which detects the brake pedal depression amount may be provided instead of the brake pressure sensor 32 as a brake operational amount detection means. During braking in which a regenerative braking force is not generated by the electrical motor 7, the controller 15 may control the braking pressure by the solenoid pilot operational portion of the pressure proportion control valve 22a, 22b based on the detected signal so that a required braking force B which depends on the pedal depression amount is generated with the brake force $B_{FO}$ of the front-wheel brake chamber 24a and the brake force $B_{RO}$ of the rear-wheel brake chamber 24b. In this case, the solenoid pilot operational portion can function as the only braking pressure regulation means and thus it is possible to omit the piping of the signal pressure, the brake valve 20 and the cut-off valves 23a, 23b.

Although the flow chart is not shown in the figure, it is possible to adapt the following aspect to the control of the controller 15. That is to say, a required braking force calculation means, a first regenerative braking force calculation means, a second regenerative braking force calculation means and a regenerative braking force setting means may be provided. The required braking force calculation means calculates a required braking force B in response to a signal pressure P of the brake valve 20. The first regenerative braking force calculation means calculates a regenerative braking force $B_M$ generated by the electrical motor 7. The second regenerative braking force calculation means calculates a regenerative braking force $B_B$ of the power supply equivalent input to the battery 7. The regenerative braking force setting means compares the values $B_M$ and $B_B$ and re-sets a regenerative braking force $B_M$ of the electrical motor 7 to $B_M$ when is $B_B$ greater than or equal to $B_M$ and re-sets the regenerative braking force $B_M$ to $B_B$ when is $B_B$ smaller than $B_M$. Furthermore the inverter 6 of the electrical motor 7 and the pressure proportional control valves 22a, 22b of the braking mechanism are controlled so that on the basis of the comparison of the set regenerative braking force $B_M$ and the required braking force B, the required braking force B is generated only by the electrical motor when $B_M$ is greater than or equal to B. When $B_M$ is smaller than B, the regenerative braking force $B_M$ is generated by the electrical motor 7 and the remainder ($B-B_M$) is generated by the brake force of the brake device. In this case, the control routine of the controller 15 is relatively simplified.

What is claimed is:

1. A braking device of a vehicle, the vehicle having an electrical motor for driving the vehicle using a battery as a power source, comprising:
   a braking force calculation means for:
   calculating a driven-wheel braking force $B_{FO}$ based on an amount of activation of a brake pedal by a driver of the vehicle,
   setting a driving-wheel braking force $B_{RO}$ based on the amount of activation of the brake pedal by the driver of the vehicle, and
   calculating a driven-wheel minimum required braking force $B_{FM}$ based on the amount of activation of the brake pedal by the driver of the vehicle;
   a required braking force calculation means for calculating a required braking force $B_O=B_{FO}+B_{RO}-B_{FM}$;
   a first regenerative braking calculation means for calculating a regenerative braking force $B_M$ which can be generated by the electrical motor;
   a second regenerative braking force calculation means for calculating a regenerative braking force $B_B$ of the power supply equivalent input to the battery;
   a regenerative braking force setting means for comparing the values $B_M$ and $B_B$, and setting $B_M$ as a regenerative braking force $B_M$ of the electrical motor when $B_B$ is greater than or equal to $B_M$, and setting $B_B$ as the regenerative braking force $B_M$ of the electrical motor when $B_B$ is smaller than $B_M$; and
   a regenerative braking control means for comparing the set regenerative braking force $B_M$ and the required braking force $B_O$, and controlling the electrical motor and a braking mechanism;
   wherein when $B_M$ is greater than or equal to $B_O$, the required braking force $B_O$ is generated only by the electrical motor, while generating the driven-wheel minimum required braking force $B_{FM}$; and
   wherein when $B_M$ is smaller than $B_O$, the regenerative braking force $B_M$ is generated by the electrical motor, while generating the driven-wheel minimum required braking force $B_{FM}$, and a remainder of the braking force $B_O-B_M$ is generated by the vehicle braking mechanism in a range of the driving-wheel braking force $B_{RO}$ and the driven-wheel braking force $B_{FO}$.

2. The braking device of a vehicle as defined in claim 1, wherein the braking mechanism includes:
   a braking plunger which applies the braking force to wheels of the vehicle based on a pressure from a pressure source;
   a pressure proportional control valve which adjusts the pressure in response to signals based on the amount of activation of the brake pedal by the driver of the vehicle;
   a pressure regulation means for regulating a pressure supplied to the pressure proportional control valve in accordance with the amount of activation of the brake pedal by the driver of the vehicle based on signals from a regenerative braking control means; and
   regenerative braking control means for controlling the pressure during regenerative braking,
   wherein a deficiency in the regenerative braking force with respect to the required braking force is generated by the brake plunger by controlling the pressure proportional control valve.

3. The braking device of a vehicle as defined in claim 2, wherein the pressure regulation means is a cut valve that supplies a signal pressure corresponding to an amount of activation of the brake pedal to the pressure proportional control valve during non-regenerative braking, and cuts off the signal pressure to the pressure proportional control valve during regenerative braking.

* * * * *